H. GALT.
DEVICE FOR MAKING COFFEE.
APPLICATION FILED DEC. 6, 1913.

1,134,526.

Patented Apr. 6, 1915.
2 SHEETS—SHEET 2.

Witnesses:
L. B. Graham
Edith Wilcox

Inventor:
Hubert Galt
By J. M. Roberts
his Atty.

THE NORRIS PETERS CO., PHOTO-LITHO., WASHINGTON, D. C.

UNITED STATES PATENT OFFICE.

HUBERT GALT, OF CHICAGO, ILLINOIS.

DEVICE FOR MAKING COFFEE.

1,134,526.

Specification of Letters Patent.

Patented Apr. 6, 1915.

Application filed December 6, 1913. Serial No. 804,983.

*To all whom it may concern:*

Be it known that I, HUBERT GALT, a citizen of the Dominion of Canada, residing at Chicago, in the county of Cook and State of Illinois, have invented certain new and useful Improvements in Devices for Making Coffee, &c., of which the following is a specification, reference being had therein to the accompanying drawing.

My invention relates to devices for making coffee, tea, and similar beverages, and its object is to provide a simple and efficient unitary device setting inside ordinary vessels of commonly known forms to make such beverages off the stove or fire.

The invention consists in the matters hereinafter set forth and then pointed out in the appended claims.

Figure 1:
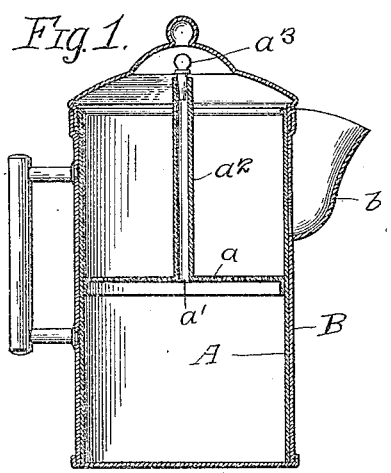
Figure 3:
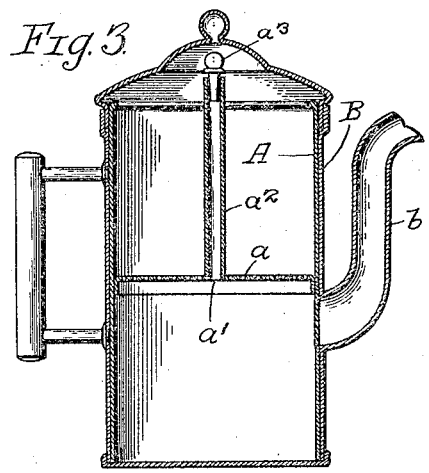
Figure 2:
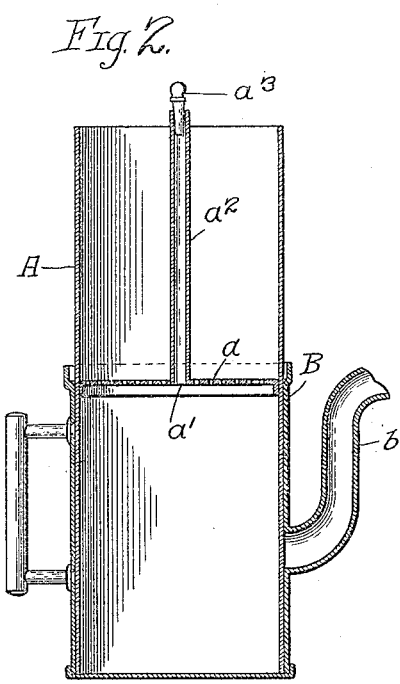
Figure 4:
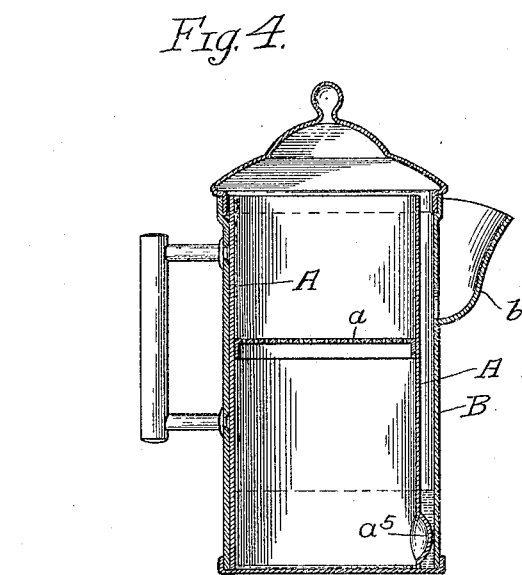
Figure 5:
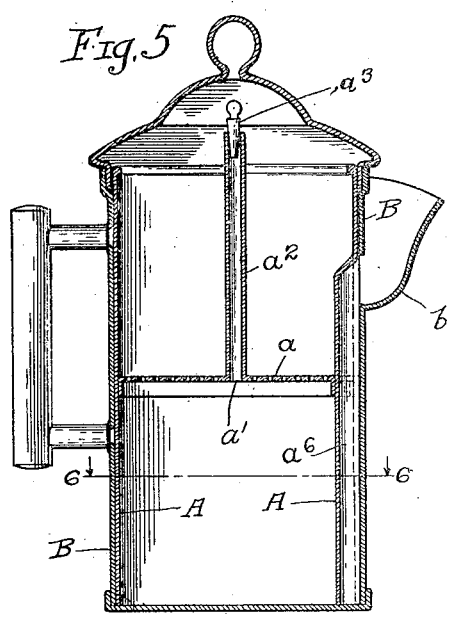
Figure 6:
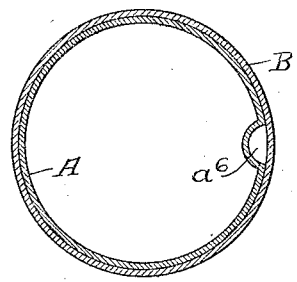
Figure 8:
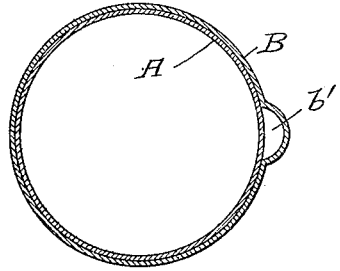
Figure 7:
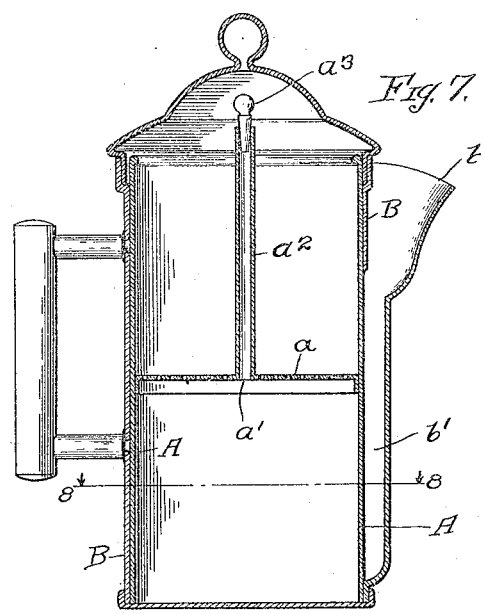

In the drawings, illustrating different embodiments of my present invention, Figure 1 is a vertical sectional view of a pot provided with a sieve-barrel of the same height as the pot and fitting therein so it may be withdrawn after the beverage is made but before it is poured; Fig. 2 is a similar view of another form of pot with the body of the sieve-barrel of greater height than the body of the pot; Fig. 3 is a similar view of a pot of the same form as in Fig. 2 provided with a sieve-barrel of the same form as in Fig. 1, but having a discharge spout near its lower end; Fig. 4 is a similar view of a pot with another form of sieve-barrel and in which the latter is of less diameter than the cross-section of the pot to provide an enlarged clearance or space between them; Figs. 5 and 6 are vertical and horizontal sectional views respectively of a modified form of organization, the latter view being on the line 6—6 of the former, and Figs. 7 and 8 are respectively similar views of another modification, the latter view being on the line 8—8 of the former.

In the drawings the reference numeral A indicates a hollow body or barrel corresponding in its cross-sectional shape or outline with that of the associated pot B, the shape of these parts being cylindrical in the present exemplification for convenience of illustration. The barrel A is open at its ends and is provided with a sieve $a$ located preferably at about its middle portion to divide it into upper and lower chambers. The sieve in the forms shown in all figures except Fig. 4 is provided with an opening $a'$ to vent the lower chamber so that the liquid will pass through the sieve into the pot when the beverage is made, and the lower end of a vent pipe $a^2$ communicates with this opening while its upper open end terminates at or near the upper line of the barrel or body where it is provided with a removable plug $a^3$. In the form shown in Fig. 4 the vent pipe is omitted and the liquid seal closing the lower end of the barrel is broken or vented by raising the lower edge of the barrel above the liquid forming it.

In the forms shown in Figs. 1 and 2 the pot B is provided with a suitable spout $b$, leading from its upper portion in Fig. 1 and from its lower portion in Fig. 2. In both these forms the removable barrel or body A fits closely or snugly within the pot, and in the form shown in Fig. 1 the barrel is substantially the same height as the pot while in Fig. 2 it is approximately double the height of the pot, it being of course understood that either barrel may be used with either pot, these parts being interchangeable in the two exemplifications, and the differences in the capacities of the barrels or bodies with reference to that of the pots being for a purpose later stated.

In the form shown in Fig. 3 the barrel is of the same size with relation to the pot as in Fig. 1 but the spout is in the lower portion of the pot so that the barrel need not be removed from the pot to pour the beverage as it will readily pass through the spout when the barrel is lifted up to have its lower edge open the spout.

In the form shown in Fig. 4 the barrel is not provided with a vent pipe, and is of less diameter than the pot, being off-centered therein by projections $a^5$, although the barrel may fit the pot snugly as in the other views. The clearance or space thus provided permits the beverage to be poured without removing the barrel from the pot, as the barrel may be raised or lifted up in the pot sufficiently above the level of the sealing liquid to allow the air to escape from the lower chamber and the beverage to run through the sieve into the lower chamber, when the barrel may be dropped back into the pot and the beverage poured from the lower chamber.

In the forms shown in Figs. 5 and 6 and in Figs. 7 and 8 respectively the barrel snugly fits the interior of the pot, but in the form shown in Figs. 5 and 6 the barrel is provided with a longitudinal channel $a^6$ leading to the spout $b$, and in the form shown in Figs. 7 and 8 the pot is provided with a similar channel $b'$, so that the beverage may be poured without removing the barrel.

When coffee, tea or other similar beverage is to be made the ground coffee, tea leaves or other material to be treated is placed in suitable quantity on the sieve in the pot with the plug closing the vent pipe when it is used, and boiling water or other liquid is then poured into the upper chamber of the barrel in proper quantity and the pot closed. A small portion of the liquid will pass through the sieve or screen into the bottom of the pot and will seal the lower portion of the barrel against escape of air between the pot and barrel, this sealing liquid rising more or less in the chamber provided by the space between the barrel and pot, as shown in Fig. 4 for example, as the pressure of the air confined in the lower chamber of the barrel is increased by the water or other liquid rising in the upper chamber of the barrel. By this construction the barrel coöperates with the pot to form a space or chamber in which a liquid seal is provided at the lower end of the barrel, the quantity of water or other liquid required to form this seal varying with the closeness of the fit of the barrel in the pot, and when the seal is complete the liquid in the upper chamber bridges over the sieve openings and covers the screen and the lower chamber is sealed so that the air in it forms a cushion to sustain the liquid contents of the upper portion of the pot above the sieve until the seal of the lower chamber is broken. The sieve divides the barrel into an upper steeping chamber in which the material is treated, and a lower air chamber to sustain the water in the upper chamber while the treatment occurs, and the tea, coffee or other material carried on the sieve in the steeping chamber mixes with the boiling water when the latter is poured into the top of pot and disseminates throughout the volume of water so as to enable the water to act upon every particle of it. After the material is steeped, the seal of the lower chamber is broken and the beverage will flow through the sieve into the pot. To break this seal the barrel in the form shown in Fig. 4 is raised high enough to allow air to escape from the lower chamber around its lower edge, usually by lifting it above the liquid level in the pot, and in the forms shown in the other figures this seal is broken by allowing air to escape from the lower chamber by pulling the plug from the vent pipe; in either case the coffee, tea or other beverage will strain through the sieve into the pot. In the forms shown in Figs. 1, 2 and 3 the barrel is ordinarily withdrawn from the pot carrying with it the spent material on the sieve before the beverage is poured from the pot, but in the other forms the beverage may be poured without removing the barrel if desired, as it will pass under its lower edge. In the forms shown in all the figures except Fig. 2 the amount of beverage thus made will be about half the liquid capacity of the pot, but of course by using a greater quantity of material the resulting beverage may be made of greater strength and the pot then filled more or less with water after the beverage passes through the sieve to obtain the full capacity of the pot, this being governed by the strength of beverage required. In the form shown in Fig. 2 the liquid capacity of the upper chamber of the barrel is approximately equal to that of the pot, so that a full pot of beverage will be made in the first instance.

I may omit the vent pipe and plug as clearly shown in Fig. 4, for example, and use other means to break the seal of the air chamber. Also while the vent opening $a'$ in the sieve may be controlled by a variety of means I prefer to employ the vent pipe and plug, and to extend the pipe above the level of the boiling water when the upper chamber of the barrel is full so that the plug may be conveniently drawn. The pipe extending to approximately the top of the barrel above the level of the boiling water provides a handle by which the sieve carrying the spent material may be withdrawn from the pot.

I claim:—

1. In a device of the class described, a pot, a hollow barrel within said pot and having open upper and lower ends, the lower end terminating near the bottom of the pot, a sieve in said barrel dividing it into upper steeping and lower air chambers and having a vent opening, and means in the upper chamber of the barrel to control the vent opening in the sieve to allow the air to escape from the air chamber.

2. In a device of the class described, a pot, a hollow cylindrical barrel removably fitting within said pot and having open upper and lower ends, a sieve in said barrel dividing it into upper steeping and lower air chambers and having a vent opening, a vent pipe whose lower end is carried by the sieve and communicates with the vent opening and whose upper end terminates near the top line of the barrel, and a plug for the free end of said pipe.

3. In a device of the class described, a pot, an open-end barrel in the pot and having a sieve extending across its body between its ends to divide it into an upper steeping chamber and a lower air chamber, the barrel below the sieve extending to near the bottom of the pot to provide a liquid seal for the lower end of the barrel to prevent the escape of air from the air chamber when the sieve is covered with liquid, whereby the liquid contents of the upper portion of the barrel are sustained above the sieve.

4. In a device of the class described, a pot, a removable sieve dividing the interior of the pot into an upper steeping chamber and a lower air chamber, means to seal the lower chamber against the escape of air when the sieve is covered with liquid in the upper chamber, a vent pipe carried by the sieve and extending above it to near the top of the upper chamber, and means to open and close the vent pipe to allow the air in the air chamber to escape.

In testimony whereof I affix my signature in presence of two witnesses.

HUBERT GALT.

Witnesses:
 J. McRoberts,
 Edith Wilcox.

Copies of this patent may be obtained for five cents each, by addressing the "Commissioner of Patents, Washington, D. C."